S. CANTERBERRY.
Plow.
No. 29,569.
Patented Aug 14, 1860.
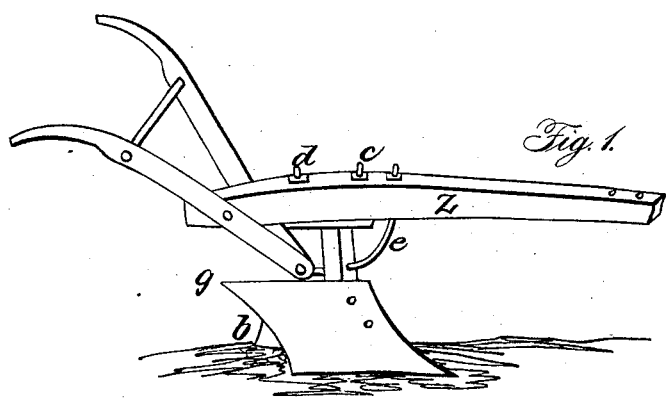
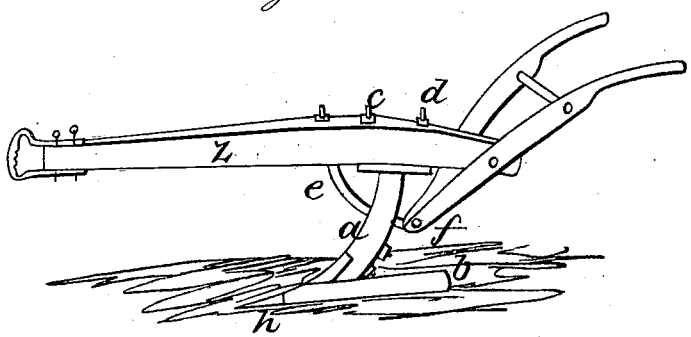
Witnesses:
John M West
T C Shipp
Inventor:
Samuel Canterberry

UNITED STATES PATENT OFFICE.

SAMUEL CANTERBERRY, OF HOLMES COUNTY, MISSISSIPPI.

IMPROVEMENT IN PLOWS.

Specification forming part of Letters Patent No. 29,569, dated August 14, 1860.

*To all whom it may concern:*

Be it known that I, SAMUEL CANTERBERRY, in the county of Holmes, in the State of Mississippi, have invented a new and useful Improvement in Plows; and I do hereby declare that the following is a full, clear, and exact description of the construction and operation of the same, reference being had to the annexed drawings, in which—

Figures 1 and 2 are perspective views.

To enable others to make and use my invention, I will proceed to describe its construction and operation.

The helve $a$ is so constructed that, being united with the bar $b$, it forms a perfect shape for a turning-plow, and, being detached from the bar, forms a perfect shovel-stock, the upper end of the helve being confined to the wooden beam $z$ by two bolts, $c$ and $d$.

The rod $e$ serves for the triple purpose of supporting the beam and the helve, and extends behind the helve, to which the lower ends of the handles $f$ are made fast by a small bolt.

The bar $b$ is so constructed that it may be easily attached to the helve by one of the bolts which screws the mold-board on, and may be replaced by a new one at trifling cost, the bar and helve both being of cast-iron.

The mold-board $g$ is made in the usual way, with the addition of a small piece, $h$, welded on the bottom of the point to give it sufficient strength and form a shoulder to fit against the square point of the bar, the mold-board being made of wrought-iron or steel.

The temper-pin $d$ is used for the double purpose of securing the helve to the beam and to give or take land from the plow.

The whole, when combined, forms a perfect, durable, and cheap turning-plow, and when the bar and mold-board are removed the helve forms a perfect shovel-stock.

What I claim as of my invention, and desire to secure by Letters Patent, is—

The arrangement of the beam $z$, helve $a$, rod $e$, bolts $c$ and $d$, handles $f$, bar $b$, piece $h$, and mold-board $g$, the whole being constructed and combined in the manner and for the purposes herein set forth.

SAMUEL CANTERBERRY.

Witnesses:
 JOHN M. WEST,
 T. C. SHIPP.